(12) United States Patent
Matsumura et al.

(10) Patent No.: US 11,307,694 B2
(45) Date of Patent: Apr. 19, 2022

(54) DISPLAY DEVICE

(71) Applicant: Japan Display Inc., Tokyo (JP)

(72) Inventors: Kazune Matsumura, Tokyo (JP); Hiroyuki Abe, Tokyo (JP); Hiroshi Tanaka, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/010,899

(22) Filed: Sep. 3, 2020

(65) Prior Publication Data

US 2021/0081067 A1 Mar. 18, 2021

(30) Foreign Application Priority Data

Sep. 13, 2019 (JP) .............................. JP2019-167681

(51) Int. Cl.
| | |
|---|---|
| *G06F 3/041* | (2006.01) |
| *G02F 1/1333* | (2006.01) |
| *G02F 1/1362* | (2006.01) |
| *G06F 3/044* | (2006.01) |
| *G02F 1/1343* | (2006.01) |
| *G02F 1/136* | (2006.01) |

(52) U.S. Cl.
CPC ........ *G06F 3/0412* (2013.01); *G02F 1/13338* (2013.01); *G02F 1/134336* (2013.01); *G02F 1/136286* (2013.01); *G06F 3/0446* (2019.05); *G02F 1/13606* (2021.01); *G02F 2201/123* (2013.01)

(58) Field of Classification Search
None
See application file for complete search history.

(56) References Cited

U.S. PATENT DOCUMENTS

| | | | |
|---|---|---|---|
| 2014/0085222 A1* | 3/2014 | Park | G06F 3/0446 345/173 |
| 2014/0118277 A1* | 5/2014 | Kim | G06F 3/0443 345/173 |
| 2016/0253023 A1* | 9/2016 | Aoyama | G06F 3/047 345/174 |
| 2016/0291721 A1* | 10/2016 | Shepelev | G06F 3/0443 |
| 2016/0328070 A1* | 11/2016 | Lin | G06F 3/04164 |
| 2016/0370944 A1* | 12/2016 | Zhao | G06F 3/0443 |
| 2017/0153746 A1 | 6/2017 | Ahn et al. | |

FOREIGN PATENT DOCUMENTS

JP 2017-102454 A 6/2017

* cited by examiner

*Primary Examiner* — Christopher R Lamb
(74) *Attorney, Agent, or Firm* — Oblon, McClelland, Maier & Neustadt, L.L.P.

(57) ABSTRACT

According to one embodiment, a display device includes a display portion including a first electrode, a second electrode, first pixel electrodes overlapping the first electrode, and second pixel electrodes overlapping the second electrode, first wiring lines connected to the first electrode, second wiring lines connected to the second electrode, and a control unit electrically connected to the first wiring lines and the second wiring lines. The display portion has a first end portion farthest from the control unit and a second end portion nearest to the control unit. The first electrode is adjacent to the first end portion. The second electrode is adjacent to the second end portion. The number of first wiring lines is a same as the number of second wiring lines.

13 Claims, 11 Drawing Sheets

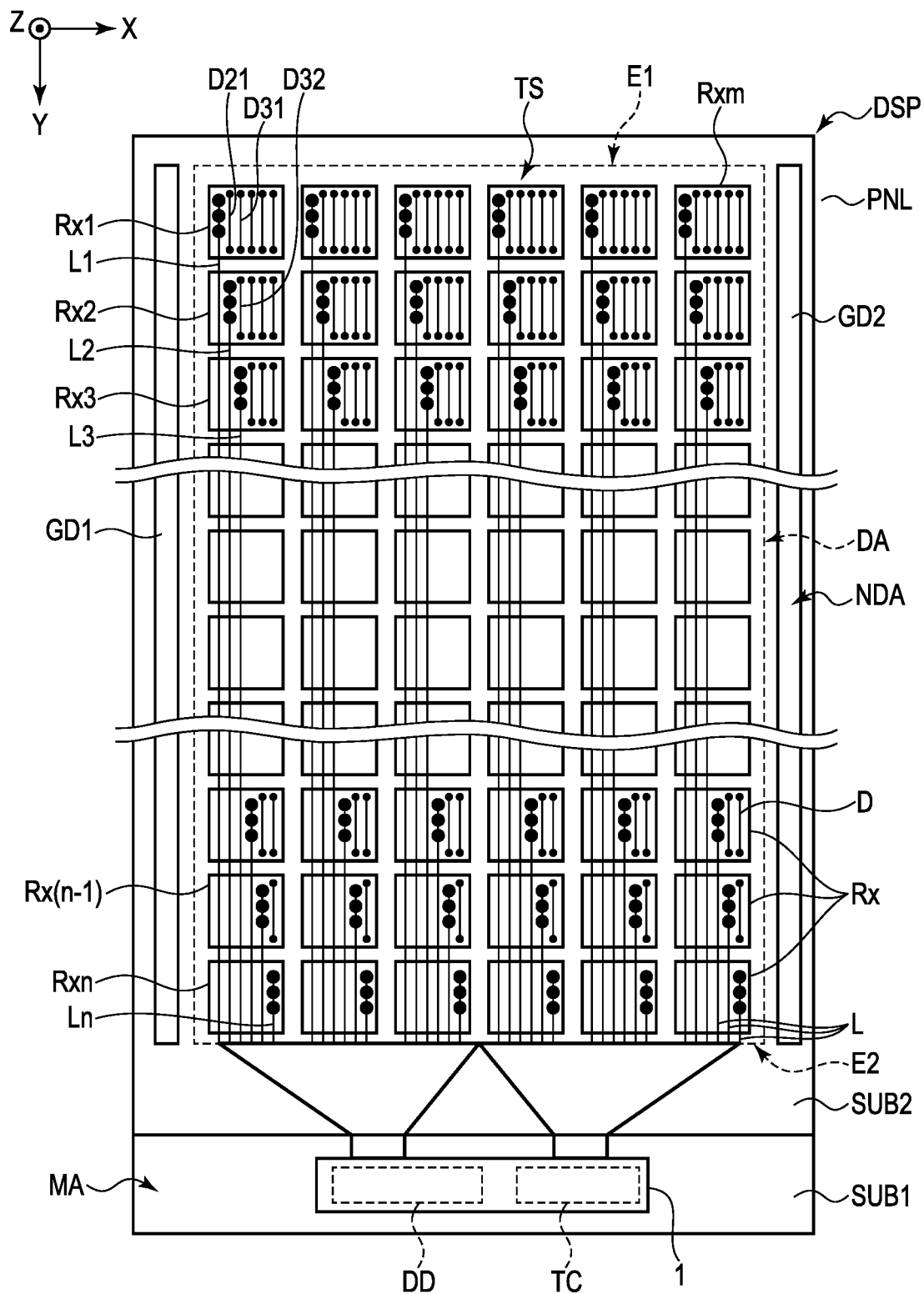
F I G. 1

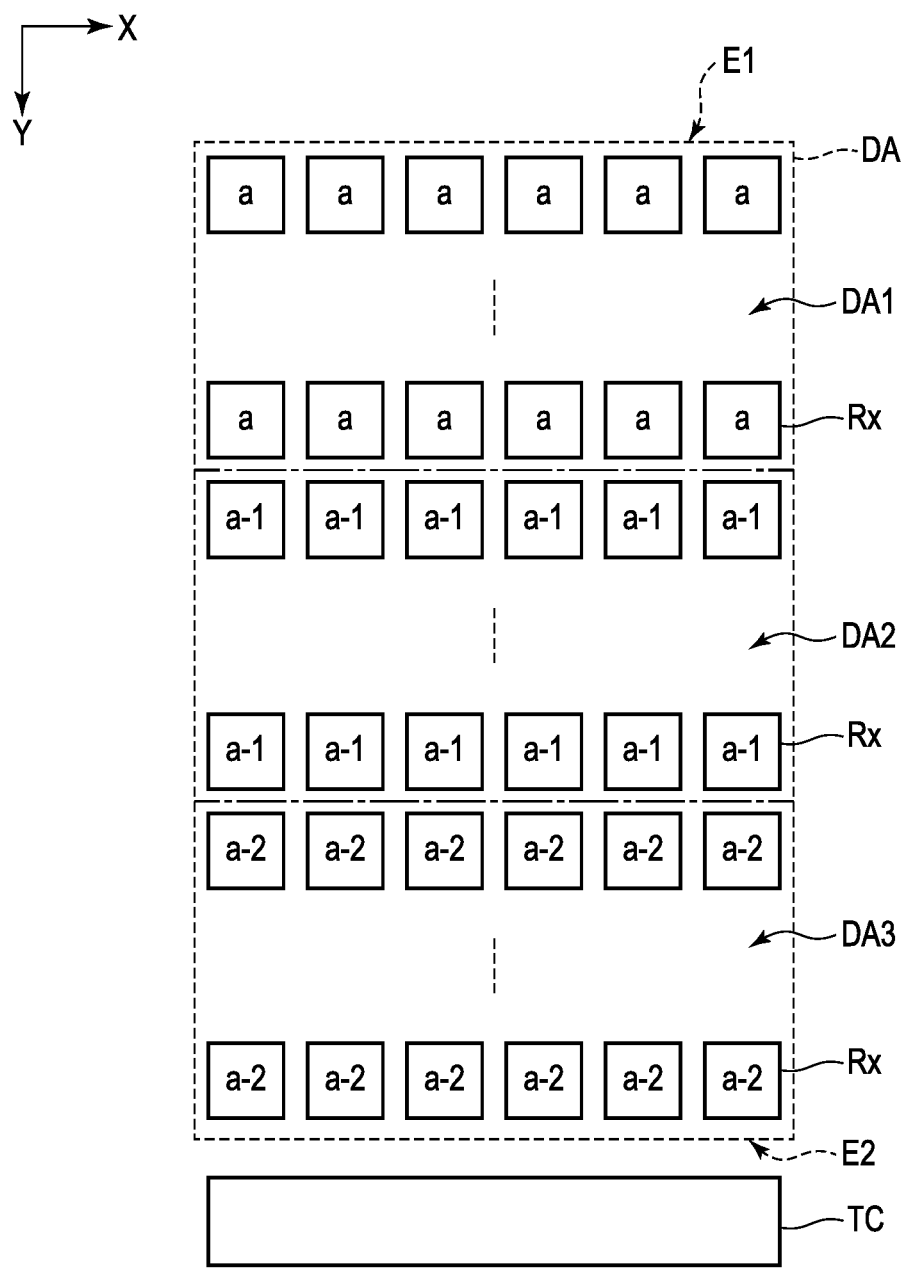
F I G. 10

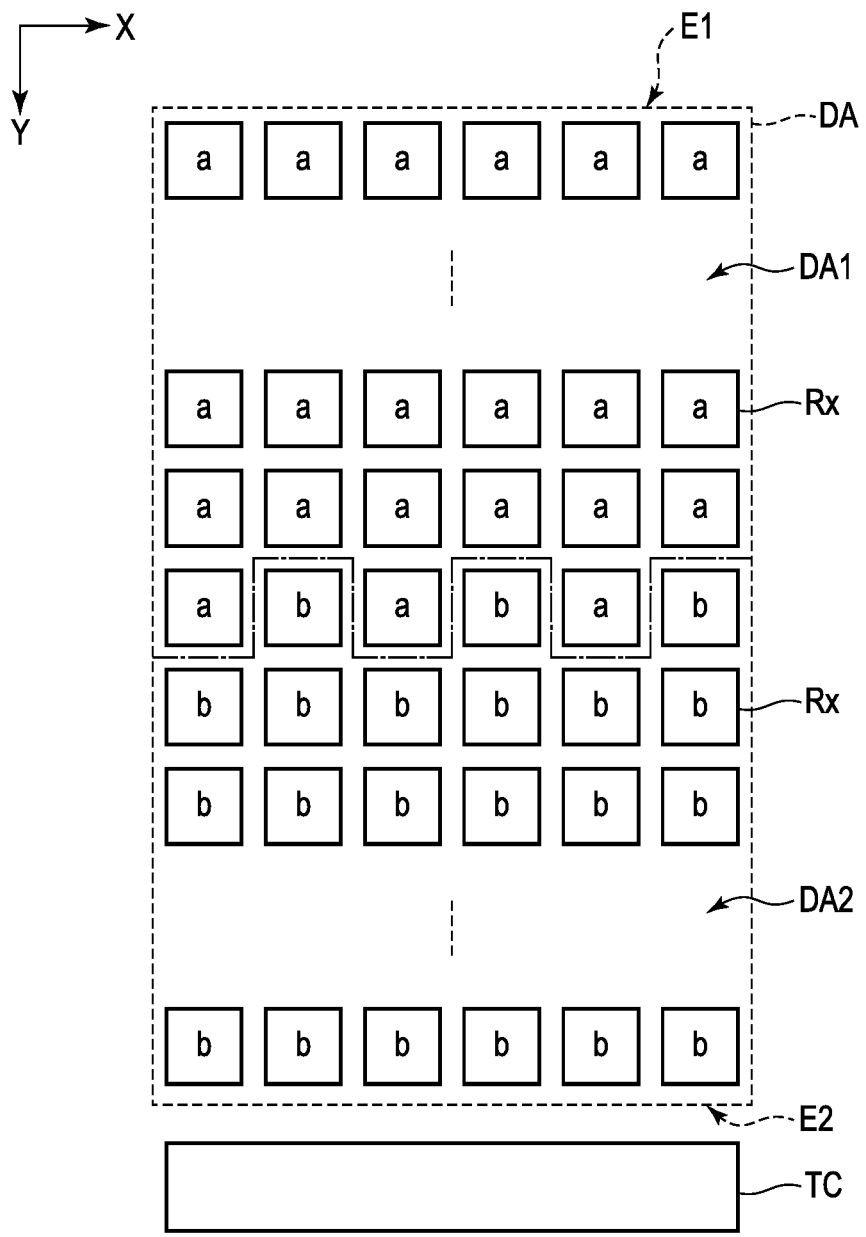
F I G. 11

DISPLAY DEVICE

CROSS-REFERENCE TO RELATED APPLICATIONS

This application is based upon and claims the benefit of priority from Japanese Patent Application No. 2019-167681, filed Sep. 13, 2019, the entire contents of which are incorporated herein by reference.

FIELD

Embodiments described herein relate generally to a display device.

BACKGROUND

Recently, a display device including a touch sensor which detects approach or contact of an object to or with the display device has been put into practical use. For example, a display device including a touch sensor not only in a display portion which displays an image but also in a peripheral area of the display portion has been proposed.

Meanwhile, in a touch sensor in which sensor electrodes are arranged in a matrix, a different in the length of a sensor line connected to each sensor electrode or the like causes a difference in time constant among the sensor electrodes. In a display device including a built-in touch sensor, a difference in time constant may cause degradation in display quality.

BRIEF DESCRIPTION OF THE DRAWINGS

FIG. 1 is a plan view showing a configuration example of a display device DSP of an embodiment.

FIG. 10 is an illustration showing the third configuration example.

FIG. 11 is an illustration showing the fourth configuration example.

DETAILED DESCRIPTION

Figure 2:
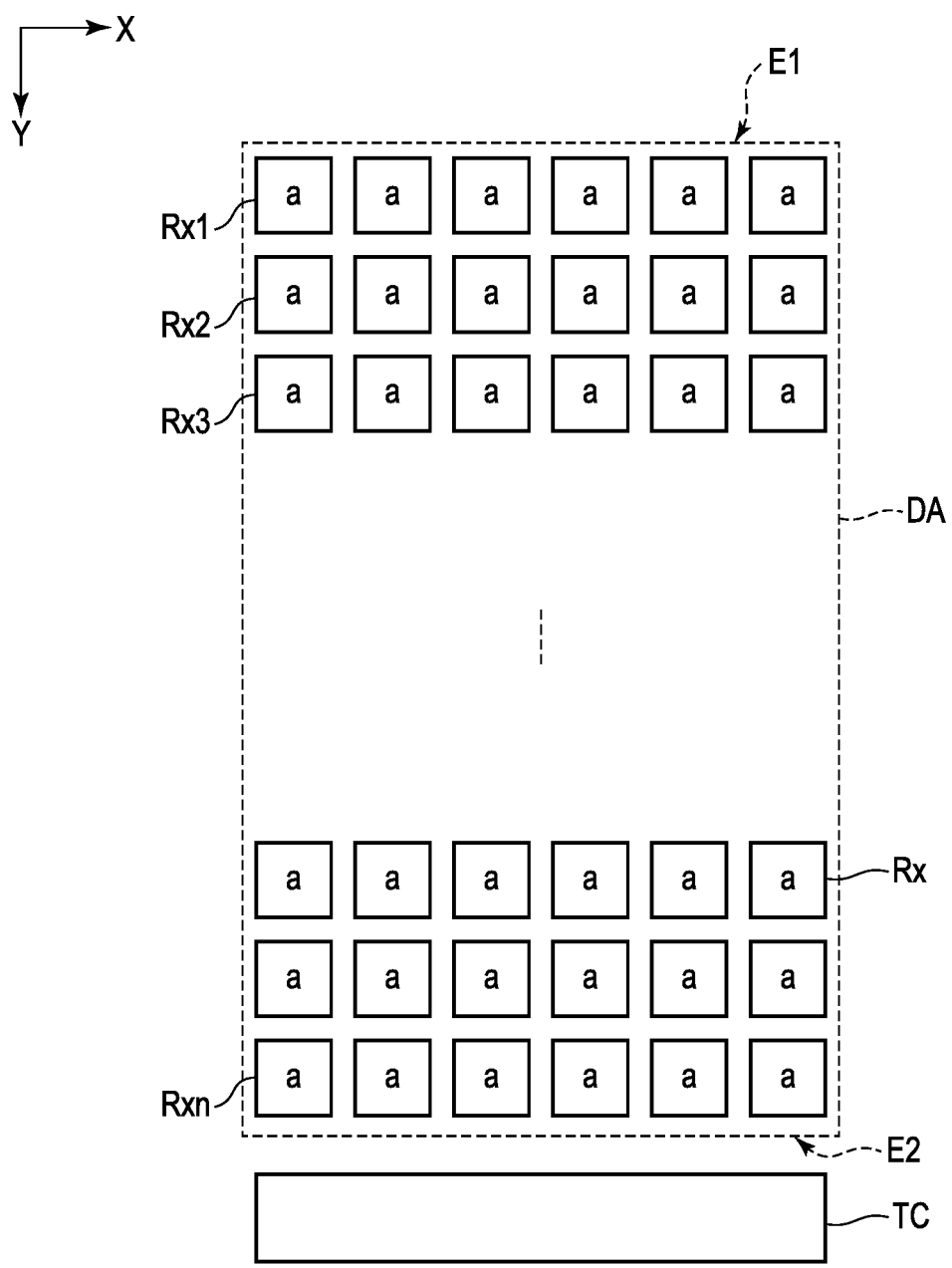
FIG. 2 is an illustration showing the first configuration example.

In general, according to one embodiment, there is provided a display device including a display portion including a first electrode, a second electrode, a plurality of first pixel electrodes overlapping the first electrode, and a plurality of second pixel electrodes overlapping the second electrode, a plurality of first wiring lines electrically connected to the first electrode, a plurality of second wiring lines electrically connected to the second electrode, and a control unit electrically connected to the first wiring lines and the second wiring lines. The display portion has a first end portion farthest from the control unit and a second end portion nearest to the control unit. The first electrode is adjacent to the first end portion. The second electrode is adjacent to the second end portion. The number of first wiring lines is a same as the number of second wiring lines.

According to another embodiment, there is provided a display device including a display portion including a first electrode, a second electrode, a plurality of first pixel electrodes overlapping the first electrode, and a plurality of second pixel electrodes overlapping the second electrode, a plurality of first wiring lines electrically connected to the first electrode, a plurality of second wiring lines electrically connected to the second electrode, and a control unit electrically connected to the first wiring lines and the second wiring lines. The display portion has a first end portion farthest from the control unit and a second end portion nearest to the control unit. The first electrode and the second electrode are located a distance of greater than or equal to D/3 away from the second end portion where D is a distance from the first end portion to the second end portion. The second electrode is located between the first electrode and the second end portion. The number of first wiring lines is a same as the number of second wiring lines.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, and the like of the respective parts are illustrated schematically in the drawings, rather than as an accurate representation of what is implemented, but such schematic illustration is merely exemplary, and in no way restricts the interpretation of the invention. In addition, in the specification and drawings, constituent elements which function in the same or a similar manner to those described in connection with preceding drawings are denoted by the same reference numbers, and detailed explanations of them that are considered redundant may be appropriately omitted.

In the embodiment, a liquid crystal display device is explained as an example of a display device DSP. Note that the main configuration disclosed in the embodiment can be applied to a self-luminous display device including an organic electroluminescent display element, a μLED or the like, an electronic paper display device including an electrophoretic element or the like, a display device employing micro-electromechanical systems (MEMS), a display device employing electrochromism, and the like. In addition, the main configuration disclosed in the embodiment is not limited to a display device but can be applied to an electronic device such as a sensor device.

FIG. 1 is a plan view showing a configuration example of a display device DSP of the embodiment. The display device DSP includes a display panel PNL and an IC chip 1. Here, for the sake of convenience, a direction along which the short sides of the display panel PNL extend is referred to as a first direction X, a direction along which the long sides of the display panel PNL extend is referred to as a second direction Y, and the thickness direction of the display panel PNL is referred to as a third direction Z. The first direction X, the second direction Y and the third direction Z are, for example, orthogonal to one another but may cross at an angle other than 90 degrees. Viewing the respective portions of the display device DSP toward an X-Y plane defined by the first direction X and the second direction Y is referred to as planar view.

The display panel PNL includes a first substrate SUB1, a second substrate SUB2 and a touch sensor TS. The first substrate SUB1 and the second substrate SUB2 overlap in planar view. The display panel PNL includes a display portion DA which displays an image and a frame-shaped non-display portion NDA which surrounds the display portion DA. The display portion DA is located in an area in which the first substrate SUB1 and the second substrate SUB2 overlap. The touch sensor TS is disposed only in the display portion DA in the illustrated example but may be disposed also in the non-display portion NDA. The main portion of the touch sensor TS is disposed in the first substrate SUB1. The first substrate SUB1 has a mounting portion MA extending in the second direction Y more than the second substrate SUB2. The IC chip 1 is connected to the mounting portion MA. Note that the IC chip 1 may be connected to a flexible printed circuit board connected to the mounting portion MA. A display driver DD and a touch controller TC are incorporated in the IC chip 1. The display driver DD outputs a signal required for displaying an image such as a video signal in an image display mode of display an image to the display panel PNL. The touch controller TC corresponds to a control unit which controls the touch sensor TS in a touch sensing mode of detecting approach or contact of an object to or with the display device DSP. Note that the touch controller TC may be incorporated in an IC chip different from that of the display driver DD.

The first substrate SUB1 includes gate drivers GD1 and GD2. The gate drivers GD1 and GD2 are arranged in the non-display portion NDA.

The display portion DA has a pair of end portions E1 and E2 extending along the first direction X. The end portion E1 corresponds to the first end portion (far end portion) which is farthest from the touch controller TC, and the end portion E2 corresponds to the second end portion (near end portion) which is nearest to the touch controller TC.

The touch sensor TS of a self-capacitance method is explained here, but the touch sensor TS may be of a mutual capacitance method. The touch sensor TS includes a plurality of sensor electrodes Rx and a plurality of sensor lines L. The sensor electrodes Rx are located in the display portion DA and are arranged in a matrix in the first direction X and the second direction Y. In the illustrated example, m sensor electrodes Rx are arranged at intervals along the first direction X, and n sensor electrodes Rx are arranged at intervals along the second direction Y between the end portion E1 and the end portion E2. Note that each of m and n is an integer greater than or equal to two, and for example, n is an integer greater than m. One sensor electrode Rx constitutes a sensor block which is the smallest unit which can perform touch sensing. The sensor lines L extend along the second direction Y and are arranged in the first direction X in the display portion DA. Each sensor line L is electrically connected to the sensor electrode Rx and is disposed at, for example, a position overlapping a signal line S which will be described later. Note that, although a plurality of sensor lines L are connected to one sensor electrode Rx, only one sensor line L connected to one sensor electrode Rx is shown in FIG. 1. Each sensor line L is drawn to the non-display portion NDA, is electrically connected to the IC chip 1, and is electrically connected to the touch controller TC inside the IC chip 1.

Here, attention is focused on the relationship between sensor lines L1 to L3 arranged in the first direction X and sensor electrodes Rx1 to Rx3 arranged in the second direction Y. The sensor electrode Rx1 is arranged at a position farthest from the touch controller TC among n sensor electrodes Rx arranged in the second direction Y in the display portion DA. The sensor line L1 overlaps n sensor electrodes Rx and is electrically connected to the sensor electrode Rx1. The sensor electrode Rx1 corresponds to the first electrode adjacent to the end portion E1, and the sensor line L1 corresponds to the first wiring line.

The sensor electrode Rx2 is arranged at a position nearer to the touch controller TC than the sensor electrode Rx1. The sensor line L2 overlaps (n−1) sensor electrodes Rx and is electrically connected to the sensor electrode Rx2. The sensor line L2 does not overlap the sensor electrode Rx1.

The sensor electrode Rx3 is arranged at a position nearer to the touch controller TC than the sensor electrode Rx2. The sensor line L3 overlaps (n−2) sensor electrodes Rx and is electrically connected to the sensor electrode Rx3. The sensor line L3 does not overlap the sensor electrodes Rx1 and Rx2.

A sensor electrode Rxn is arranged at a position nearest to the touch controller TC among n sensor electrodes Rx arranged in the second direction Y in the display portion DA. A sensor line Ln overlaps the sensor electrode Rxn and is electrically connected to the sensor electrode Rxn. The sensor line Ln does not overlap the other sensor electrodes Rx1 to Rx(n−1) located farther than the sensor electrode Rxn. The sensor electrode Rxn corresponds to the second electrode adjacent to the end portion E2, and the sensor line Ln corresponds to the second wiring line.

A dummy line D is different from the sensor line L, is not drawn to the non-display portion NDA, and is not directly subjected to a voltage from a signal source such as the touch controller TC. The dummy line D is arranged correspondingly to each sensor electrode Rx. For example, a dummy line D21 overlaps the sensor electrode Rx1, is electrically connected to the sensor electrode Rx1, and is apart from the sensor line L2. The sensor line L2 and the dummy line D21 are located on the same signal line as will be described later.

A dummy line D31 overlaps the sensor electrode Rx1 and is electrically connected to the sensor electrode Rx1. A dummy line D32 is apart from the dummy line D31 and the sensor line L3. The dummy line D32 overlaps the sensor electrode Rx2 and is electrically connected to the sensor electrode Rx2. The sensor line L3 and the dummy lines D31 and D32 are located on the same signal line.

In the touch sensing mode, the touch controller TC applies a sensor drive voltage to the sensor lines L. Accordingly, the sensor drive voltage is applied to the sensor electrodes Rx, and touch sensing is performed in the sensor electrodes Rx. Sensor signals corresponding to the sensing results in the sensor electrodes Rx are output to the touch controller TC via the sensor lines L. The touch controller TC or an external host detects the presence or absence of approach or contact of an object to or with the display device DSP and the position coordinates of an object based on the sensor signals.

Note that the sensor electrodes Rx function as common electrodes CE subjected to a common voltage (Vcom) in the image display mode. The common voltage is applied from, for example, a voltage supply unit included in the display driver DD via the sensor lines L.

FIG. 2 is an illustration showing the first configuration example. In FIG. 2, each sensor electrode Rx is shown by a rectangle, and the number of sensor lines connected to the sensor electrode Rx is shown as "a". The number a of sensor lines connected to the sensor electrode Rx1 is the same as the number a of sensor lines connected to the sensor electrode Rxn. In addition, in the display portion DA, with regard to n sensor electrodes Rx arranged in the second direction Y, the numbers a of sensor lines connected to them are all the same. Here, the number a is an integer greater than or equal to two. Furthermore, in the display portion DA, in a case where m sensor electrodes Rx are arranged along the first direction X and n sensor electrodes Rx are arranged along the second direction Y, with regard to m*n sensor electrodes Rx, the numbers a of sensor lines connected to them are all the same.

Figure 3:
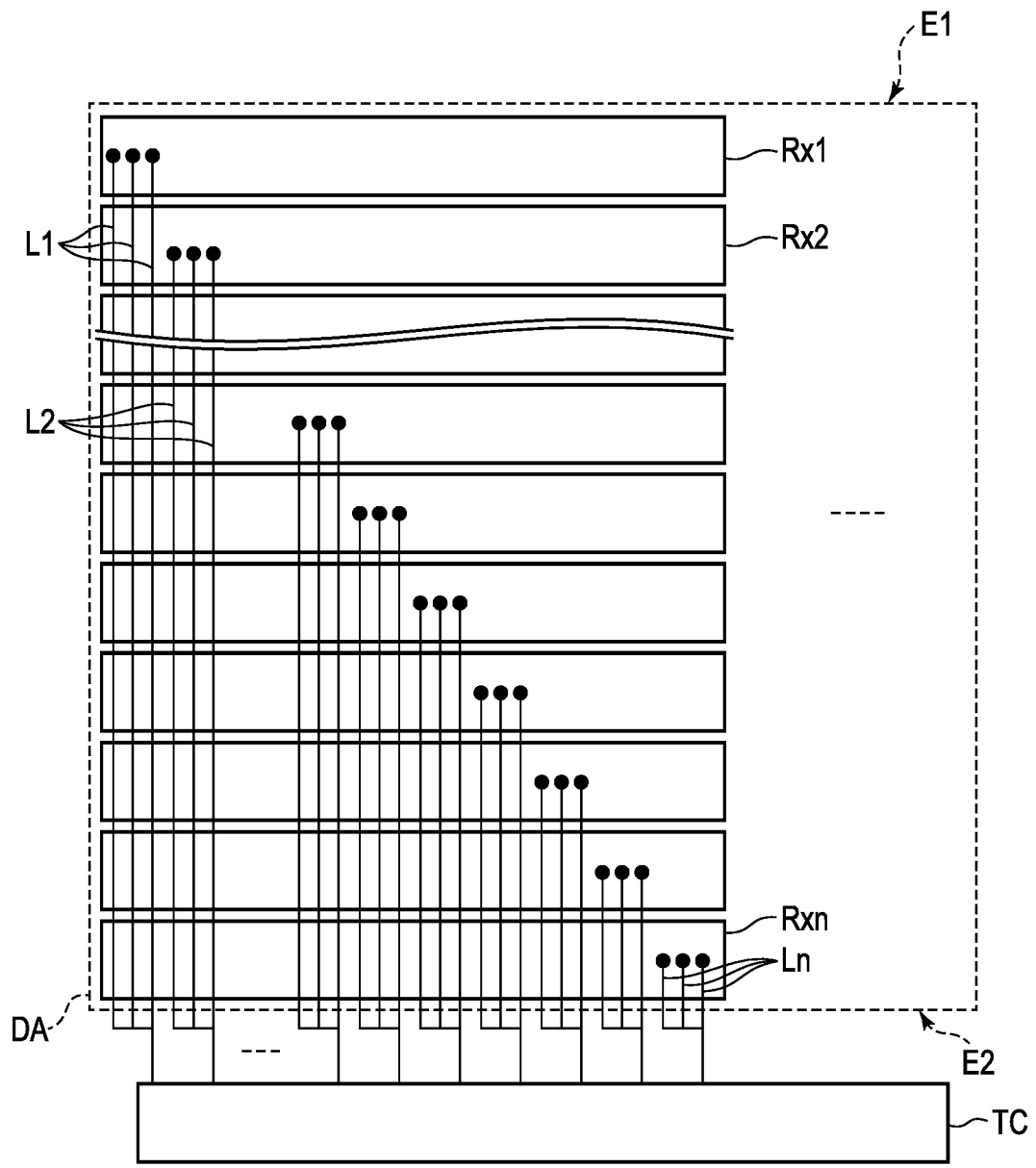
FIG. 3 is an illustration showing a specific example of the first configuration example shown in FIG. 2.

FIG. 3 is an illustration showing a specific example of the first configuration example shown in FIG. 2. The specific example illustrated here corresponds to a case where the number a shown in FIG. 2 is three. That is, the number of sensor lines L1 connected to the sensor electrode Rx1 and the number of sensor lines Ln connected to the sensor electrodes Rxn are three. The sensor lines L1 to Ln are electrically connected to the touch controller TC, respectively.

Figure 4:
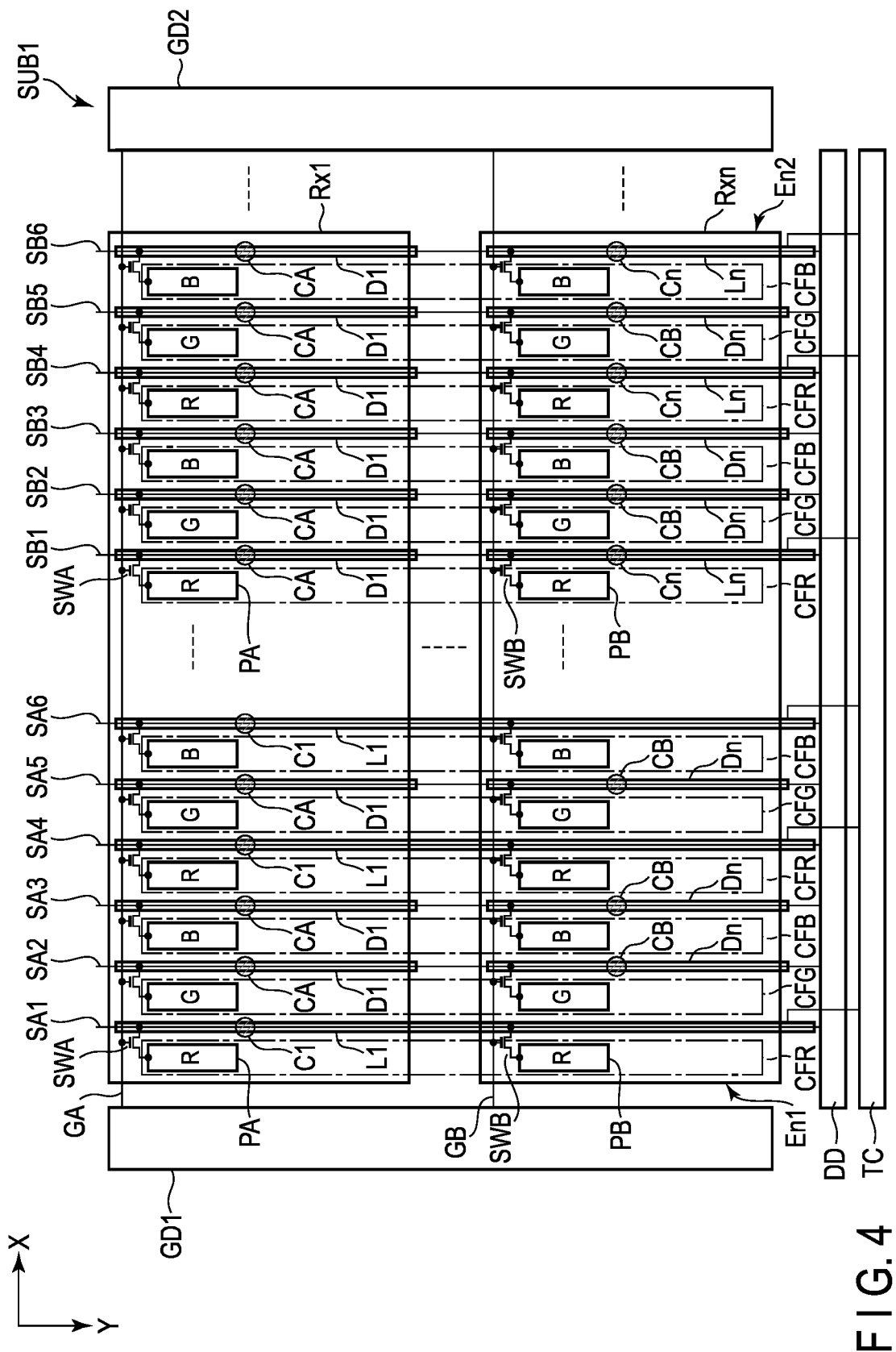
FIG. 4 is an enlarged plan view of sensor electrodes Rx1 and Rxn of a first substrate SUB1 shown in FIG. 1.

FIG. 4 is an enlarged plan view of the sensor electrodes Rx1 and Rxn of the first substrate SUB1 shown in FIG. 1. The first substrate SUB1 includes scanning lines GA and GB, signal lines SA1 to SA6, signal lines SB1 to SB6, sensor electrodes Rx1 and Rxn, sensor lines L1 and Ln, dummy lines D1 and Dn, switching elements SWA and SAB, and pixel electrodes PA and PB. A red color filter CFR, a green color filter CFG and a blue color filter CFB shown by dot-dashed lines are disposed in the second substrate SUB2 shown in FIG. 1.

The scanning lines GA and GB extend along the first direction X, and are electrically connected to the gate drivers GD1 and GD2. The signal lines SA1 to SA6 and the signal lines SB1 to SB6 are arranged in the first direction X, extend along the second direction Y, and are electrically connected to the display driver DD. Note that these signal lines are assumed to extend in the second direction Y even if parts of them are bent.

Three sensor lines L1 overlap the sensor electrodes Rx1 and Rxn, and are electrically connected to the sensor electrode Rx1 in connection portions C1. In addition, the sensor lines L1 overlap the signal lines SA1, SA4 and SA6, respectively, and are electrically connected to the touch controller TC.

Three sensor lines Ln overlap the sensor electrode Rxn, does not overlap the sensor electrode Rx1, and are electrically connected to the sensor electrode Rxn in connection portions Cn. In addition, the sensor lines Ln overlap the signal lines SB1, SB4 and SB6, respectively, and are electrically connected to the touch controller TC.

The signal lines SA1 to SA6 and the signal lines SB1 to SB6 cross the sensor electrodes Rx1 and Rxn. The sensor electrode Rxn has end portions En1 and En2 along the first direction X. The end portion En1 corresponds to an end portion on the gate driver GD1 side. The end portion En2 is located on a side opposite to the end portion En1 and corresponds to an end portion on the gate driver GD2 side. The signal line SA1 is disposed at a position nearest to the end portion En1 among the signal lines crossing the sensor electrodes Rxn. The signal line SB6 is disposed at a position nearest to the end portion En2 among the signal lines crossing the sensor electrode Rxn.

As described above, when attention is focused on the sensor electrode Rxn, the sensor line L1 overlaps the signal line SA1 at a position near to its one end portion En1, and the sensor line Ln overlaps the signal line SB6 at a position near to its other end portion En2. That is, at a position overlapping the sensor electrode Rxn, the sensor lines L1 to Ln are not concentrated in one end portion En1 or the other end portion En2 of the sensor electrode Rxn but are arranged at substantially equal intervals.

The dummy lines D1 overlap the sensor electrode Rx1 and are electrically connected to the sensor electrode Rx1 in connection portions CA. The dummy lines D1 overlap the signal lines SA2, SA3, SA5 and SB1 to SB6, respectively. The dummy lines Dn overlap the sensor electrode Rxn and are electrically connected to the sensor electrode Rxn in connection portions CB. The dummy lines Dn overlap the signal lines SA2, SA3, SA5, SB2, SB3 and SB5, respectively.

For example, when attention is focused on the signal line SA4, the sensor line L1 overlaps the signal line SA4 from a portion overlapping the sensor electrode Rx1 to a portion overlapping the sensor electrode Rxn. In addition, when attention is focused on the signal line SA5, the dummy line D1 overlaps the signal line SA5 in a portion overlapping the sensor electrode Rx1, the dummy line Dn overlaps the signal line SA5 in a portion overlapping the sensor electrode Rxn, and the dummy line D1 is apart from the dummy line Dn.

Furthermore, when attention is focused on the signal line SB4, the dummy line D1 overlaps the signal line SB4 in a portion overlapping the sensor electrode Rx1, the sensor line Ln overlaps the signal line SB4 in a portion overlapping the sensor electrode Rxn, and the dummy line D1 is apart from the sensor line Ln.

The switching elements SWA are electrically connected to the scanning line GA. The pixel electrodes PA overlap the sensor electrode Rx1 and are electrically connected to the switching elements SWA, respectively. The pixel electrode PA is electrically connected to any one of the signal lines SA1 to SA6 or any one of the signal lines SB1 to SB6 via the switching element SWA. The sensor electrode Rx1 functions as a common electrode with respect to the pixel electrodes PA.

The switching elements SWB are electrically connected to the scanning line GB. The pixel electrodes PB overlap the sensor electrode Rxn and are electrically connected to the switching elements SWB, respectively. The pixel electrode PB is electrically connected to any one of the signal lines SA1 to SA6 or any one of the signal lines SB1 to SB6 via the switching element SWB. The sensor electrode Rxn functions as a common electrode with respect to the pixel electrodes PB.

The red color filter CFR, the green color filter CFG and the blue color filter CFB are arranged in the first direction X and extend along the second direction Y. In addition, each of the red color filter CFR, the green color filter CFG and the blue color filter CFB overlaps the pixel electrodes PA and PB arranged in the second direction Y.

For example, the pixel electrode PA electrically connected to the signal line SA4 via the switching element SAW overlaps the red color filter CFR, the pixel electrode PA electrically connected to the signal line SA5 overlaps the green color filter CFG, and the pixel electrode PA electrically connected to the signal line SA6 overlaps the blue color filter CFB. In addition, the pixel electrode PB electrically connected to the signal line SB4 via the switching element SWB overlaps the red color filter CFR, the pixel electrode PB electrically connected to the signal line SB5 overlaps the green color filter CFG, and the pixel electrode PB electrically connected to the signal line SB6 overlaps the blue color filter CFB.

In such a configuration, for example, the pixel electrodes PA correspond to the first pixel electrodes, the signal line SA4 or SA6 corresponds to the first signal lines, the pixel electrodes PB correspond to the second pixel electrodes, the signal line SB4 or SB6 correspond to the second signal lines.

In addition, the signal line SA5 corresponds to the third signal line, the pixel electrode PA electrically connected to the signal line SA5 corresponds to the third pixel electrode, the pixel electrode PB electrically connected to the signal line SA5 corresponds to the fourth pixel electrode, the dummy line D1 overlapping the signal line SA5 corresponds to the first dummy line, and the dummy line Dn overlapping the signal line SA5 corresponds to the second dummy line.

Figure 5:
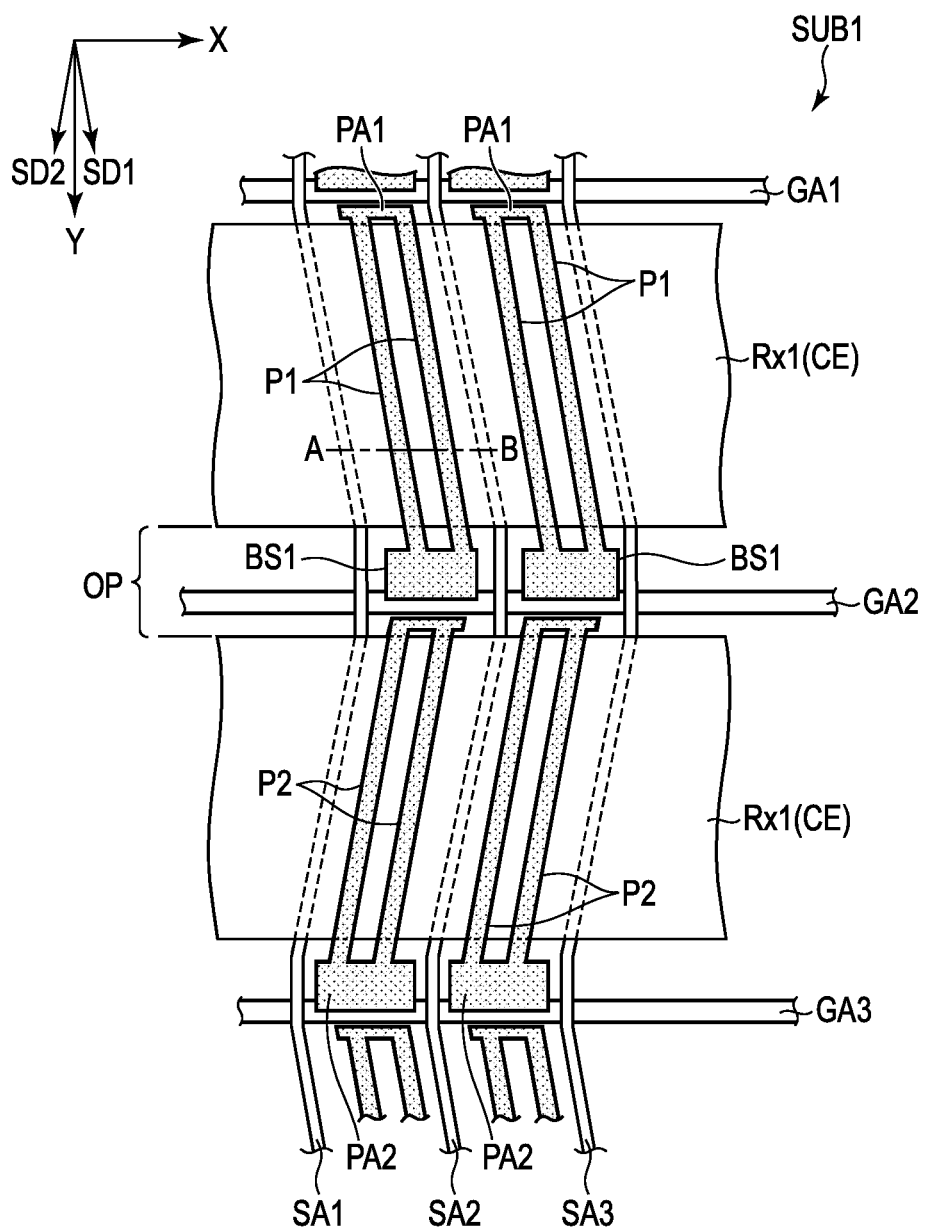
FIG. 5 is a plan view showing an example of a pixel layout in the first substrate SUB1.

FIG. 5 is a plan view showing an example of a pixel layout in the first substrate SUB1. Only a configuration required for explanation is illustrated here. Scanning lines GA1 to GA3 linearly extend along the first direction X and are arranged at intervals in the second direction Y. Signal lines SA1 to SA3 extend substantially along the second direction Y and are arranged at intervals in the first direction X.

Pixel electrodes PA1 are located between the scanning lines GA1 and GA2 and are arranged along the first direction X. The pixel electrode PA1 has a base portion BS1 and a strip electrode P1. The base portion BS1 is located in an opening OP of the sensor electrode Rx1. The strip electrode P1 overlaps the sensor electrode Rx1. The strip electrode P1 extends along a slanting direction SD1 different from the first direction X and the second direction Y.

Although not described in detail, pixel electrodes PA2 are located between the scanning lines GA2 and GA3. The pixel electrode PA2 has a strip electrode P2 overlapping the sensor electrode Rx1. The strip electrode P2 extends along a slanting direction SD2 different from the slanting direction SD1. Each of the number of strip electrodes P1 and the number of strip electrodes P2 is two in the illustrated example but may be one or greater than or equal to three.

Figure 6:
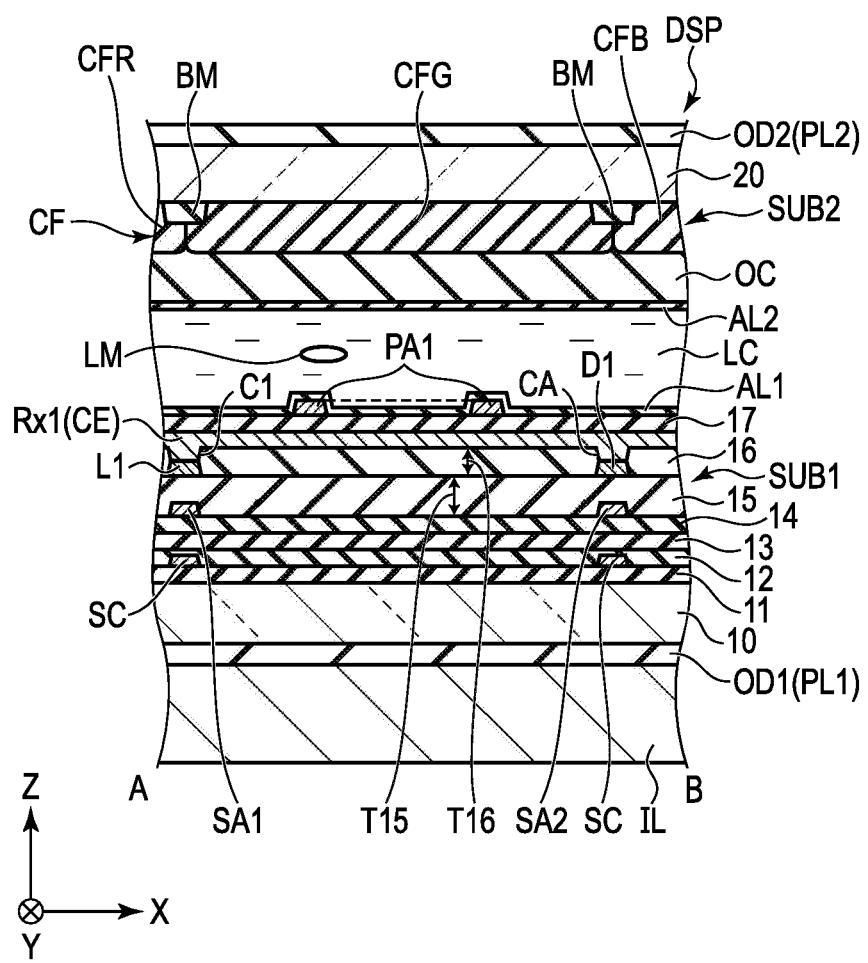
FIG. 6 is a cross-sectional view of the display device DSP taken along line A-B shown in FIG. 5.

FIG. 6 is a cross-sectional view of the display device DSP taken along line A-B shown in FIG. 5. The illustrated example corresponds to a case where a display mode using a lateral electric field is applied.

The first substrate SUB1 includes an insulating substrate 10, insulating films 11 to 17, a semiconductor layer SC, the signal lines SA1 and SA2, the sensor line L1, the dummy line D1, the sensor electrode Rx1, the pixel electrode PA1, an alignment film AL1 and the like. The insulating film 11 is located on the insulating substrate 10, the insulating film 12 is located on the insulating film 11, the insulating film 13 is located on the insulating film 12, the insulating film 14 is located on the insulating film 13, the insulating film 15 is located on the insulating film 14, the insulating film 16 is located on the insulating film 15, and the insulating film 17 is located on the insulating film 16. Each of the insulating films 11 to 14 and the insulating film 17 is, for example, an inorganic insulating film formed of an inorganic material such as silicon oxide, silicon nitride or silicon oxynitride. Each of the insulating films 15 and 16 is, for example, an organic insulating film formed of an organic material such as acrylic resin.

The semiconductor layer SC is provided in the switching element SWA shown in FIG. 4, is located on the insulating film 11, and is covered with the insulating film 12. The semiconductor layer SC is formed of, for example, polycrystalline silicon but may be formed of amorphous silicon or oxide semiconductor. A scanning line which is not shown in the drawing is located between, for example, the insulating films 12 and 13.

The signal lines SA1 and SA2 are located on the insulating film 14 and are covered with the insulating film 15. The sensor line L1 and the dummy line D1 are located on the insulating film 15 and are covered with the insulating film 16. The sensor line L1 is located directly above the signal line SA1, and the dummy line D1 is located directly above the signal line SA2. The sensor line L1 and the dummy line D1 extend parallel to the signal lines SA1 and SA2, respectively. Each of the signal lines SA1 and SA2, the sensor line L1 and the dummy line D1 is formed of a metal material.

The sensor electrode Rx1 is located on the insulating film 16 and is covered with the insulating film 17. The sensor electrode Rx1 penetrates the insulating film 16 in the connection portion C1 and is in contact with the sensor line L1. In addition, the sensor electrode Rx1 penetrates the insulating film 16 in the connection portion CA and is in contact with the dummy line D1.

The pixel electrode PA1 is located on the insulating film 17 and is covered with the alignment film AL1. The pixel electrode PA1 overlaps the sensor electrode Rx1 with the insulating film 17 sandwiched in between. Each of the sensor electrode Rx1 and the pixel electrode PA1 is formed of a transparent conductive material.

In this first substrate SUB1, the insulating film 15 corresponds to the first organic insulating film, the insulating film 16 corresponds to the second organic insulating film. A thickness T15 of the insulating film 15 is greater than a thickness T16 of the insulating film 16. Since the insulating film 15 having the relatively large thickness T15 is disposed between the signal line SA1 and the sensor line L1, the coupling of the signal line SA1 and the sensor line L1 is suppressed, and the parasitic capacitance of the sensor line L1 is reduced. In addition, sensor lines other than the sensor line L1 are located between the insulating films 15 and 16 and overlap the sensor electrode Rx1, but since the insulating film 16 having the relatively large thickness T16 is disposed between the other sensor lines and the sensor electrode Rx1, the coupling of the other sensor lines and the sensor electrode Rx1 is suppressed, and the parasitic capacitances of the other sensor lines are reduced.

The second substrate SUB2 includes an insulating substrate 20, a light-shielding layer BM, a color filter layer CF, an overcoat layer OC, an alignment film AL2 and the like. Similarly to the insulating substrate 10, the insulating substrate 20 is a transparent substrate such as a glass substrate or a flexible resin substrate. The color filter layer CF includes the red color filter CFR, the green color filter CFG and the blue color filter CFB. The green color filter CFG is opposed to the pixel electrode PA1. The red color filter CFG and the blue color filter CFB are also opposed to other pixel electrodes, respectively. The overcoat layer OC covers the color filter layer CF. The alignment film AL2 covers the overcoat layer OC. Each of the alignment films AL1 and AL2 is formed of, for example, a material exhibiting horizontal alignment properties.

A liquid crystal layer LC is located between the first substrate SUB1 and the second substrate SUB2 and is held between the alignment film AL1 and the alignment film AL2. The liquid crystal layer LC contains liquid crystal molecules LM.

An optical element OD1 including a polarizer PL1 is bonded to the insulating substrate 10. An optical element OD2 including a polarizer PL2 is bonded to the insulating substrate 20. Note that each of the optical elements OD1 and OD2 may include a retarder, a scattering layer, an antireflective layer or the like as needed. An illumination device IL is opposed to the first substrate SUB1 via the optical element OD1.

The image display mode in this display device DSP will be explained. The sensor electrode Rx1 functions as the common electrode CE with respect to the pixel electrode PA1 in the image display mode. In an off state where no electric field is formed between the pixel electrode PA1 and the common electrode CE, the liquid crystal molecules LM are initially aligned in a predetermined direction between the alignment films AL1 and AL2. In this off state, illumination light emitted from the illumination device IL is absorbed by the optical elements OD1 and OD2, and this results in dark display. On the other hand, in an on state where an electric field is formed between the pixel electrode PA1 and the common electrode CE, the liquid crystal molecules LM are aligned in a direction different from the initial alignment direction by the electric field, and the alignment direction is controlled by the electric field. In this on state, a part of the illumination light from the illumination device IL is transmitted through the optical elements OD1 and OD2, and this results in light display.

As explained above, a plurality of sensor lines L1 are connected to the sensor electrode Rx1 adjacent to the end portion E1 which is the far end portion of the display portion DA, a plurality of sensor lines Ln are connected to the sensor electrode Rxn adjacent to the end portion E2 which is the near end portion of the display portion DA, and the number of sensor lines connected to the sensor electrode Rx1 is the same as the number of sensor lines connected to the sensor electrode Rxn.

Here, a comparative example where sensor electrodes are arranged in the first area on the far end side and the second area on the near end side, respectively, and the number of sensor lines connected to the sensor electrode in the first area is different from the number of sensor lines connected to the sensor electrode in the second area will be considered. For example, it is assumed that four sensor lines are connected to the sensor electrode in the first area, and two sensor lines are connected to the sensor electrode in the second area. In a case where a specific image is displayed over the entire area of the display portion DA, a difference in the time constant of the sensor lines causes a difference between the display luminance of the first area and the display luminance of the second area. Therefore, the boundary between the first area and the second area is visually recognized, and the display quality is degraded.

On the other hand, according to the first configuration example of the present embodiment, the same number of sensor lines L are connected to each of the sensor electrodes Rx arranged in the display portion DA. Therefore, a difference between the time constant of the sensor lines L connected to the sensor electrode Rx on the far end side and the time constant of the sensor lines L connected to the sensor electrode Rx on the near end side is small as compared to the comparative example. Therefore, even in a case where a specific image is displayed over the entire area of the display portion DA, a visually recognizable difference is not caused in display luminance, and degradation in display quality is suppressed.

In addition, since each sensor line L overlaps the signal line, as compared to a case where the sensor line is deviated from the signal line in planar view, a decrease in aperture area contributing to display is suppressed.

Furthermore, while the sensor line Ln connected to the sensor electrode Rxn on the near end side does not overlap the sensor electrode Rx1 on the far end side, the sensor line L1 connected to the sensor electrode Rx1 overlaps the sensor electrode Rxn. Although many other unconnected sensor lines overlap the sensor electrode Rxn, the insulating film 16 which is an organic insulating film is interposed between the other sensor lines and the sensor electrode Rxn. The insulating film 16 has the larger thickness T16 than the inorganic insulating films. Therefore, the coupling of the other sensor lines and the sensor electrode Rxn is suppressed, and the parasitic capacitances of the other sensor lines are reduced.

In addition, dummy lines D overlap signal lines which the sensor lines L do not overlap. The dummy lines D are electrically connected to the corresponding sensor electrodes Rx, respectively. Therefore, the sensor electrodes Rx formed of a transparent conductive material having a relatively high resistance are made less resistive.

A main pixel corresponding to the smallest unit for realizing color display is composed of a plurality of sub-pixels. The sub-pixel is the smallest unit which can be individually controlled according to a video signal. For example, the main pixel is composed of a red pixel, a green pixel and a blue pixel. The red pixel corresponds to an area in which a pixel electrode overlapping the red color filter CFR is disposed, the green pixel corresponds to an area in which a pixel electrode overlapping the green color filter CFG is disposed, and a blue pixel corresponds to an area in which a pixel electrode overlapping the blue color filter CFB is disposed. In this main pixel, the color having the highest luminous efficacy of the human eye among red, green and blue is green. That is, the luminance of the green pixel has a high percentage of contribution to the luminance of the main pixel as compared to the luminance of the red pixel and the luminance of the blue pixel. Therefore, if the video signal supplied to the green pixel is degraded, the display quality may be degraded.

As described above, the sensor line L does not overlap but the dummy line D overlaps the signal line electrically connected to the pixel electrode overlapping the green color filter CFG. A drive signal transmitted to the sensor electrode Rx and a sensor signal received from the sensor electrode Rx are supplied to the sensor line L. The dummy line D is electrically connected to the sensor electrode Rx or the common electrode CE. Therefore, the degradation in the video signal supplied to the signal line (or the influence on the display of the main pixel) in a case where the signal line and the dummy line D are coupled with each other is suppressed more than that of a case where the signal line and the sensor line L are coupled with each other. Therefore, degradation in display quality can be suppressed.

Here, the configuration example of the sensor line L will be explained with reference to FIGS. 7A to 7C. Here, a case where each of the number of sensor lines L1 to the number of sensor lines Ln is three will be explained.

Figure 7A:
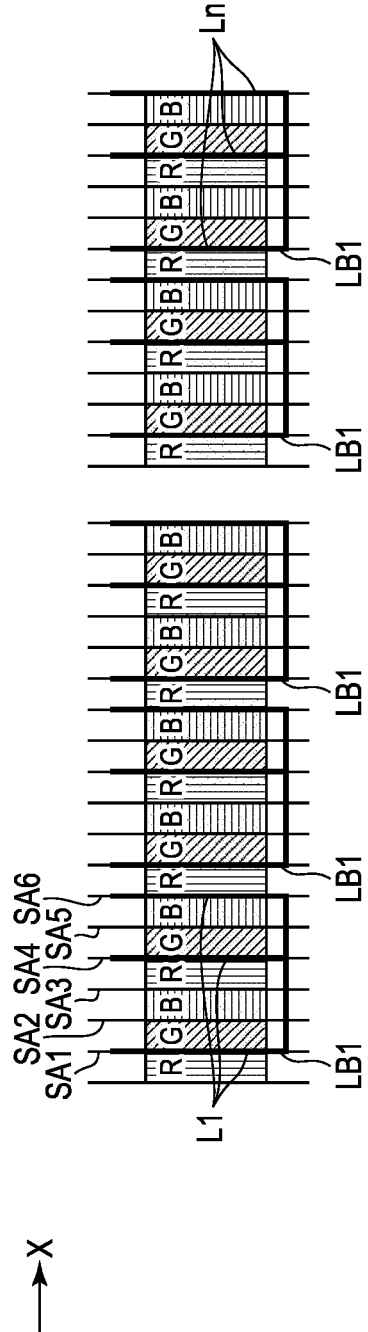
FIG. 7A is an illustration showing a configuration example of a sensor line L.

The configuration example shown in FIG. 7A corresponds to a case where three sensor lines L1 overlap any of six signal lines SA1 to SA6 arranged in order along the first direction X. That is, three sensor lines L1 constitute a first wiring line block LB1 arranged over six signal lines. The other sensor lines also constitute substantially the same first wiring line blocks LB1. As described above, the sensor line L1 does not overlap the signal line of the green pixel but overlaps the signal line of the blue pixel or the signal line of the red pixel. In the illustrated example, the sensor lines L1 overlaps the signal lines SA1, SA4 and SA6.

Figure 7B:
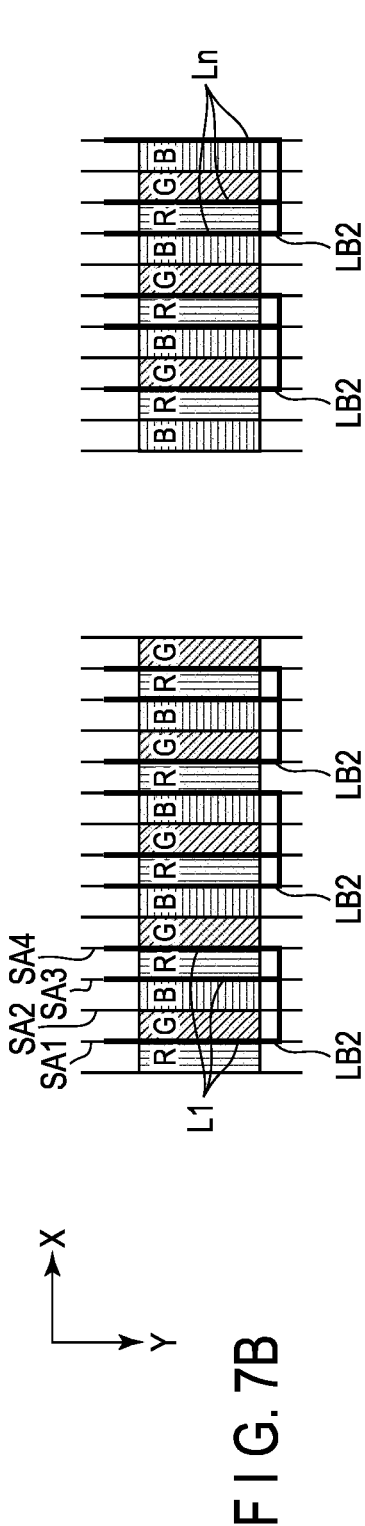
FIG. 7B is an illustration showing a configuration example of the sensor line L.

The configuration example shown in FIG. 7B corresponds to a case where three sensor lines L1 overlap any of four signal lines SA1 to SA4 arranged in order along the first direction X. That is, three sensor lines L1 constitute a second wiring line block LB2 arranged over four signal lines. The other sensor lines also constitute substantially the same wiring line blocks LB2. In the illustrated example, the sensor lines L1 overlap the signal lines SA1, SA3 and SA4.

Figure 7C:
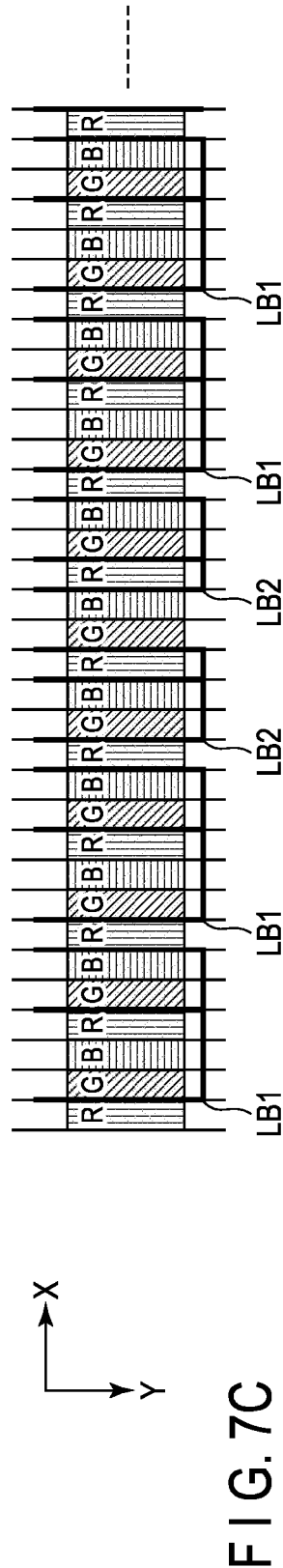
FIG. 7C is an illustration showing a configuration example of the sensor line L.

The configuration example shown in FIG. 7C corresponds to a case where the first wiring line block LB1 shown in FIG. 7A and the second wiring line block LB2 shown in FIG. 7B are combined with each other. In the illustrated example, two first wiring line blocks LB1 and two second wiring line blocks LB2 are alternately arranged along the first direction X.

Next, other configuration examples will be explained.

Figure 8:
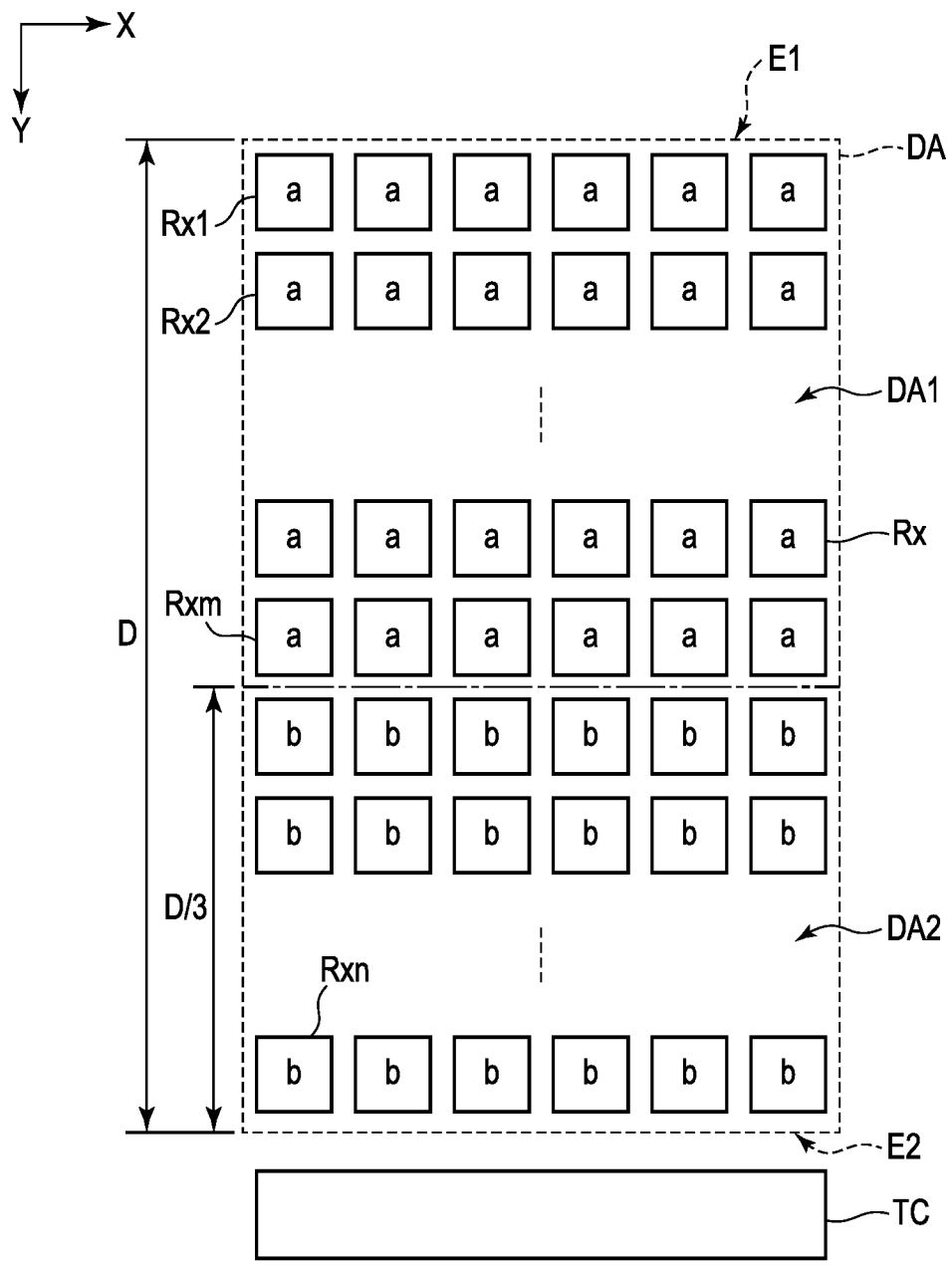
FIG. 8 is an illustration showing the second configuration example.

FIG. 8 is an illustration showing the second configuration example. In the second configuration example, attention is focused on an area DA1 of the display portion DA which is located a distance of greater than or equal to D/3 away from the end portion E2 where D is the distance along the second direction from the end portion E1 to the end portion E2. In the display portion DA, n sensor electrodes Rx are arranged along the second direction Y. In the area DA1, m sensor electrodes Rx are arranged along the second direction Y. Note that m is less than n (m<n). In the area DA1, the sensor electrode Rx1 is adjacent to the end portion E1, and the sensor electrode Rxm is located between the sensor electrode Rx1 and the end portion E2. The number a of sensor lines connected to the sensor electrode Rx1 is the same as the number a of sensor lines connected to the sensor electrode Rxm. In addition, in the display portion DA, with regard to m sensor electrodes Rx arranged in the second direction Y, the numbers a of sensor lines connected to them are all the same. Here, a is an integer greater than or equal to two.

In an area DA2 which is located from the end portion E2 to a distance of D/3, the number b of sensor lines connected to each sensor electrode Rx may be different from the number a or the same as the number a.

Figure 9:
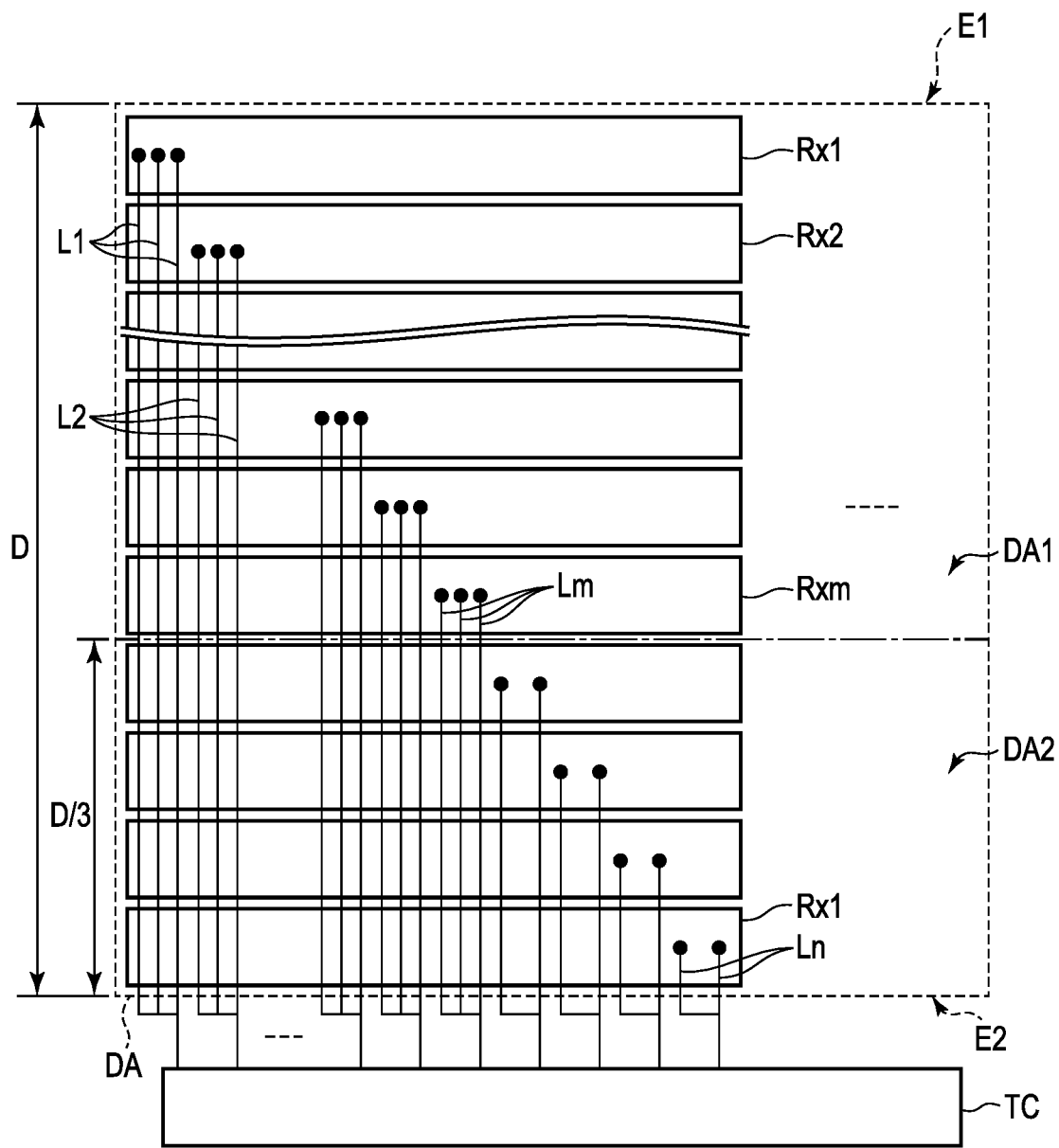
FIG. 9 is an illustration showing a specific example of the second configuration example shown in FIG. 8.

FIG. 9 is an illustration showing a specific example of the second configuration example shown in FIG. 8. The specific example illustrated here corresponds to a case where the number a shown in FIG. 8 is three and the number b shown in FIG. 8 is two. That is, in the area DA1, the number of sensor lines L1 connected to the sensor electrode Rx1 and the number of sensor lines Lm connected to the sensor electrode Rxm are three. In the area DA2, the number of sensor lines Ln connected to the sensor electrodes Rxn is two. The sensor lines L1 to Ln are electrically connected to the touch controller TC, respectively.

According to the findings of the inventors, it is confirmed that, even when the number a and the number b are different from each other (b<a), if the distance from the boundary between the area DA1 and the area DA2 to the end portion E2 is less than D/3, the boundary is not visually recognized. Therefore, since the numbers of sensor lines connected to the respective sensor electrodes are all the same in the area DA1 located a distance of greater than or equal to D/3 away from the end portion E2, substantially the same effects as those of the first configuration example can be obtained.

FIG. 10 is an illustration showing the third configuration example. The display portion DA has areas DA1 to DA3 arranged along the second direction Y. In the area DA1, the number of sensor lines connected to each sensor electrode Rx is a. In the area DA2, the number of sensor lines connected to each sensor electrode Rx is (a−1). In the area DA3, the number of sensor lines connected to each sensor electrode Rx is (a−2). That is, the number of sensor lines decreases by one from the end portion E1 toward the end portion E2. For example, in a case where the number a is four, four sensor lines are connected to the sensor electrode Rx of the area DA1, three sensor lines are connected to the sensor electrode Rx of the area DA2, and two sensor lines are connected to the sensor electrode Rx of the area DA3.

According to this third configuration example, the difference in the time constant of the sensor lines between the area DA1 and the area DA2 is small, and the boundary between the area DA1 and the area DA2 is less likely to be visually recognized. Similarly, the difference in the time constant of the sensor lines between the area DA2 and the area DA3 is small, and the boundary between the area DA2 and the area DA3 is less likely to be visually recognized. Therefore, substantially the same effects as those of the first configuration example can be obtained.

FIG. 11 is an illustration showing the fourth configuration example. The display portion DA has areas DA1 and DA2 arranged along the second direction Y. In the area DA1, the number of sensor lines connected to each sensor electrode Rx is a. In the area DA2, the number of sensor lines connected to each sensor electrode Rx is b. The number a is different from the number b (a>b). The fourth configuration example is different from the second configuration example and the third configuration example in that a zigzag boundary is formed between the area DA1 and the area DA2. That is, the sensor electrode Rx connected to a sensor lines and the sensor electrode Rx connected to b sensor lines are arranged in the first direction X.

Accordingly, the boundary between the area DA1 and the area DA2 is less likely to be visually recognized, and substantially the same effects as those of the first configuration example can be obtained.

As described above, according to the present embodiment, the display device which suppresses degradation in display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   a display portion comprising a first electrode, a second electrode, a plurality of first pixel electrodes overlapping the first electrode, a plurality of second pixel electrodes overlapping the second electrode, a plurality of signal lines supplying signals to the plurality of first pixel electrodes and the plurality of second pixel electrodes, and color filters overlapping the plurality of first pixel electrodes and the plurality of second pixel electrodes;
   a plurality of first wiring lines electrically connected to the first electrode and arranged in a first direction;
   a plurality of second wiring lines electrically connected to the second electrode and arranged in the first direction; and
   a control unit electrically connected to the first wiring lines and the second wiring lines and located adjacent to the display portion in a second direction crossing the first direction, wherein the color filters include a red color filter, a blue color filter, and a green color filter, the plurality of first pixel electrodes include a first A pixel electrode overlapping the red color filter, a first B pixel electrode overlapping the blue color filter, and a first C pixel electrode overlapping the green color filter, the plurality of second pixel electrodes include a second A pixel electrode overlapping the red color filter, a second B pixel electrode overlapping the blue color filter, and a second C pixel electrode overlapping the green color filter, the plurality of signal lines include a first signal line, a second signal line, and a third signal line, the first signal line supplies a signal to pixel electrodes overlapping the red color filter, the second signal line supplies a signal to pixel electrodes overlapping the blue color filter, the third signal line supplies a signal to pixel electrodes overlapping the green color filter, the display portion has a first end portion farthest from the control unit and a second end portion nearest to the control unit in the second direction, the first electrode is adjacent to the first end portion, the second electrode is adjacent to the second end portion, the number of first wiring lines is a same as the number of second wiring lines, the first signal line overlaps one of the first wiring lines, the second signal line overlaps one of the second wiring lines, and the third signal line does not overlap the first wiring lines and the second wiring lines.

2. The display device of claim 1, wherein
the first wiring lines overlap the first electrode and the second electrode, and
the second wiring lines overlap the second electrode but do not overlap the first electrode.

3. The display device of claim 1, further comprising a dummy line electrically connected to the first electrode, wherein
the dummy line overlaps the second signal line and is apart from the second wiring line.

4. The display device of claim 1, further comprising:
a first dummy line electrically connected to the first electrode; and
a second dummy line electrically connected to the second electrode, wherein
the first dummy line and the second dummy line overlap the third signal line.

5. The display device of claim 1, wherein each of the number of first wiring lines and the number of second wiring lines is three.

6. The display device of claim 1, further comprising:
a first organic insulating film disposed between the first signal line and the first wiring lines; and
a second organic insulating film disposed between the first wiring lines and the first electrode.

7. The display device of claim 6, wherein a thickness of the first organic insulating film is greater than a thickness of the second organic insulating film.

8. A display device comprising:
a display portion comprising a first electrode, a second electrode, a plurality of first pixel electrodes overlapping the first electrode, a plurality of second pixel electrodes overlapping the second electrode, a plurality of signal lines supplying signals to the plurality of first pixel electrodes and the plurality of second pixel electrodes, and color filters overlapping the plurality of first pixel electrodes and the plurality of second pixel electrodes;
a plurality of first wiring lines electrically connected to the first electrode and arranged in a first direction;
a plurality of second wiring lines electrically connected to the second electrode and arranged in the first direction; and
a control unit electrically connected to the first wiring lines and the second wiring lines and located adjacent to the display portion in a second direction crossing the first direction, wherein
the color filters include a red color filter, a blue color filter, and a green color filter,
the plurality of first pixel electrodes include a first A pixel electrode overlapping the red color filter, a first B pixel electrode overlapping the blue color filter, and a first C pixel electrode overlapping the green color filter,
the plurality of second pixel electrodes include a second A pixel electrode overlapping the red color filter, a second B pixel electrode overlapping the blue color filter, and a second C pixel electrode overlapping the green color filter,
the plurality of signal lines include a first signal line, a second signal line, and a third signal line,
the first signal line supplies a signal to pixel electrodes overlapping the red color filter,
the second signal line supplies a signal to pixel electrodes overlapping the blue color filter,
the third signal line supplies a signal to pixel electrodes overlapping the green color filter,
the display portion has a first end portion farthest from the control unit and a second end portion nearest to the control unit in the second direction,
the first electrode and the second electrode are located a distance of greater than or equal to D/3 away from the second end portion where D is a distance from the first end portion to the second end portion,
the second electrode is located between the first electrode and the second end portion,
the number of first wiring lines is a same as the number of second wiring lines,
the first wiring lines overlap the first electrode and the second electrode,
the second wiring lines overlap the second electrode but do not overlap the first electrode, and
the third signal line does not overlap the first wiring lines and the second wiring lines.

9. The display device of claim 8, wherein
one of the first wiring lines overlaps the first signal line, and
one of the second wiring lines overlaps the second signal line.

10. The display device of claim 8, further comprising a dummy line electrically connected to the first electrode, wherein
the dummy line overlaps the second signal line and is apart from the second wiring line.

11. The display device of claim 8, wherein each of the number of first wiring lines and the number of second wiring lines is three.

12. The display device of claim 8, further comprising:
a first organic insulating film disposed between the first signal line and the first wiring lines; and
a second organic insulating film disposed between the first wiring lines and the first electrode.

13. The display device of claim 12, wherein a thickness of the first organic insulating film is greater than a thickness of the second organic insulating film.

\* \* \* \* \*